United States Patent
Flanagan

(10) Patent No.: US 6,945,459 B2
(45) Date of Patent: Sep. 20, 2005

(54) SUPPLY CHAIN MANAGEMENT SYSTEM AND METHOD

(75) Inventor: Peter Flanagan, Dublin (IE)

(73) Assignee: Principal Software Developments Limited, Dublin (IE)

( * ) Notice: Subject to any disclaimer, the term of this patent is extended or adjusted under 35 U.S.C. 154(b) by 0 days.

(21) Appl. No.: 10/806,101

(22) Filed: Mar. 23, 2004

(65) Prior Publication Data

US 2004/0177012 A1 Sep. 9, 2004

Related U.S. Application Data

(63) Continuation of application No. PCT/IE03/00053, filed on Apr. 7, 2003.

(30) Foreign Application Priority Data

Apr. 5, 2002 (IE) .......................................... 2002/0254

(51) Int. Cl.$^7$ ............................................. G06F 17/60
(52) U.S. Cl. ........................ 235/385; 235/375; 235/376; 235/384
(58) Field of Search ................................ 235/383, 384, 235/385, 375, 376; 705/6–8, 10

(56) References Cited

U.S. PATENT DOCUMENTS

| | | | | |
|---|---|---|---|---|
| 6,546,303 B1 | * | 4/2003 | Fried et al. | 700/106 |
| 6,564,226 B1 | * | 5/2003 | Dickson et al. | 707/104.1 |
| 6,764,004 B2 | * | 7/2004 | White | 235/385 |
| 6,778,872 B2 | * | 8/2004 | Jorgenson et al. | 700/106 |
| 2002/0111819 A1 | * | 8/2002 | Li et al. | 705/1 |

* cited by examiner

*Primary Examiner*—Ahshik Kim
(74) *Attorney, Agent, or Firm*—Jacobson Holman PLLC

(57) ABSTRACT

A supply chain management system (1) has a server (2) and a tracking database (3) linked to multiple remote transaction sites (10, 15, 16, 17, 18). A manufacturing facility (10) manufactures a product (12) and the system (1) assigns a unique reference to it. This reference includes a component identifying the location (10) of production. Each subsequent operation involving the product along the supply chain generates transaction data and the system (1) records a transaction record for it. If the product is modified such as by splitting the pallet, the original reference is terminated and no more transaction records can be generated for it. The modified product is assigned a fresh reference and a series of tracking records is generated as it moves along the supply chain.

12 Claims, 3 Drawing Sheets

SUPPLY CHAIN MANAGEMENT SYSTEM AND METHOD

This is a continuation of PCT/IE03/00053 filed Apr. 7, 2003 and published in English.

FIELD OF THE INVENTION

The invention relates to the manufacture, handling, tracking and storage of goods throughout the entire supply chain process.

PRIOR ART DISCUSSION

At present, manufacturers of products such as food and medical products operate tracking systems so that they have traceability in the event of a batch being found to be faulty for some reason. Such systems appear to be effective for particular manufacturers within the confines of shipment of particular products. However, comprehensive traceability for the full supply chain for all related gods is often not achieved, and if it is, it is very time-consuming for administration personnel. The problems preventing good comprehensive traceability being achieved are:

- tracking all components before manufacture into a product, the components often being bought in from third parties,
- splitting of product items such as transfer of some (but not all) cases from one pallet to another,
- maintenance of records for products manufactured some years previously, and
- products from different manufacturers being mixed in or on containers at some stage of the supply chain.

These problems make it very difficult for a warehouse to manage products from multiple suppliers in a unified manner.

The invention addresses these problems.

SUMMARY OF THE INVENTION

According to the invention, there is provided a supply chain management method implemented by a processor, a storage device, a communications interface, and user terminals or computers, the method comprising the steps of:

(a) generating a unique reference for a new product;

(b) generating a transaction record for each operation performed with the product for a supply chain, each transaction record including the associated unique reference without change;

(c) terminating the unique reference when the product reaches the end of the configured supply chain by preventing recordal of further transaction records for it; and (d) if the product is modified in the supply chain, terminating the unique reference by preventing recordal of further transaction records for it, generating a unique reference for the modified product, and performing steps (a) to (c) for the modified product.

In one embodiment, the step (d) comprises linking the unique reference for the modified product with that for the source product.

In another embodiment, each unique reference includes a series of components, each chosen according to a particular parameter.

In a further embodiment, the first component is an identifier of the location where the product originated.

In one embodiment, the method includes a unique identifier for each of a plurality of locations for a plurality of manufacturing or supply organizations.

In another embodiment, each component is unique within the preceding component.

In a further embodiment, splitting of a collection of items such as splitting of a pallet is treated as modification of the original product.

In one embodiment, such modification spawns a plurality of fresh references, each for a sub-division of the original product.

In another embodiment, the method validates generation of a fresh unique reference by comparing measure units of the modified product with those of the source product, and generates an error message if they are different.

In a further embodiment, a transaction type identifier is included with each transaction record.

In one embodiment, a transaction type identifier for the transaction which generates the product is included as a component in the unique reference.

In another embodiment, each transaction record comprises a unique transaction identifier.

In a further embodiment, a transaction record includes a plurality of unique references, each for a product involved in the transaction, such as combining two products in a manufacturing operation.

In one embodiment, some locations have an associated unit of measure and an error message is generated if different measure data is received for a location.

In another aspect, the invention provides a supply chain management system comprising means for performing a method as defined above.

DETAILED DESCRIPTION OF THE INVENTION

BRIEF DESCRIPTION OF THE DRAWINGS

The invention will be more clearly understood from the following description of some embodiments thereof, given by way of example only with reference to the accompanying drawings in which.

DESCRIPTION OF THE EMBODIMENTS

Figure 1:
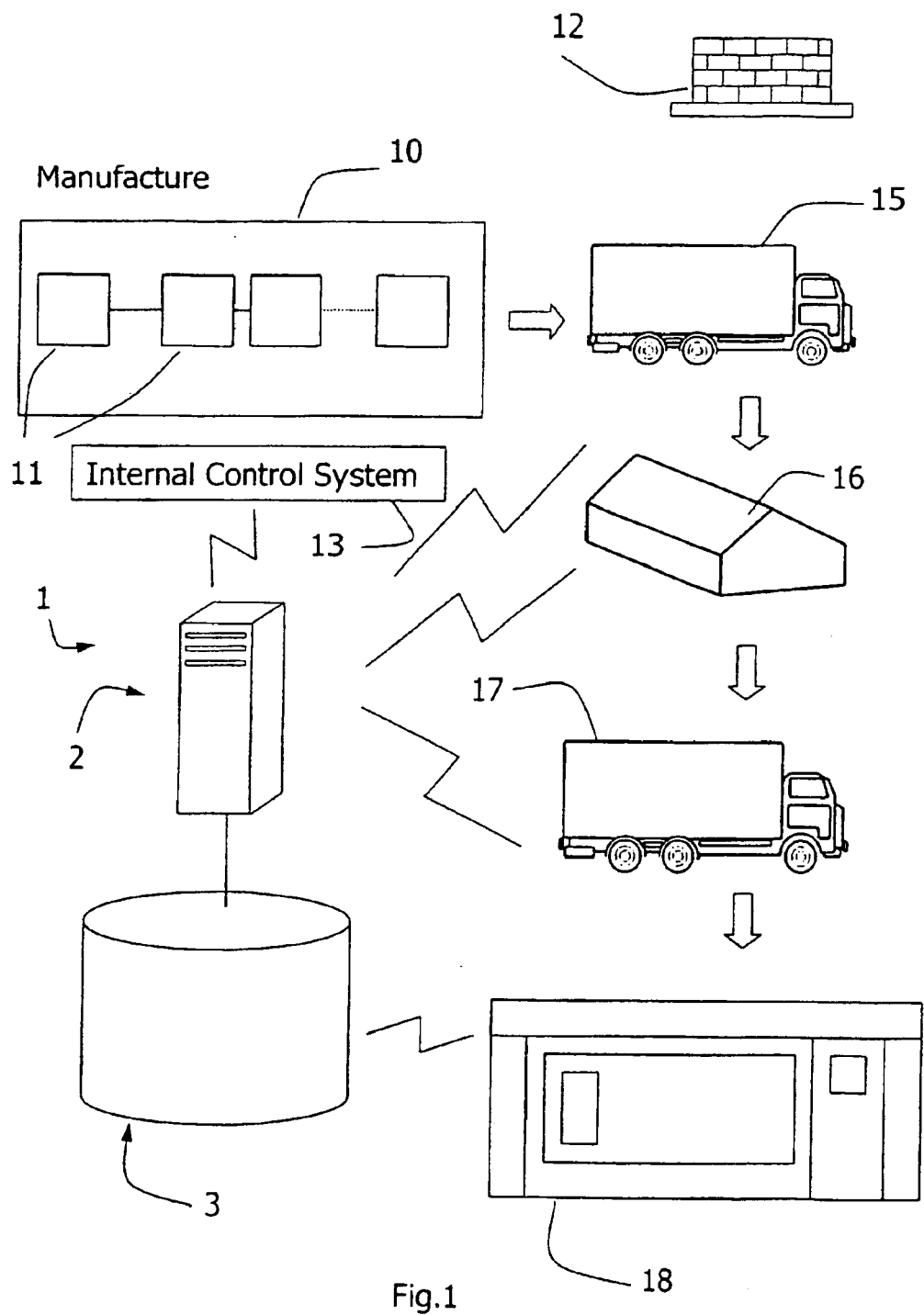
FIG. 1 is a diagram illustrating a supply chain management system of the invention, and the context in which it operates.

Referring to FIG. 1 a supply chain management system 1 comprises a server 2 and a tracking database 3. The system tracks products through the full supply chain with excellent traceability despite possible splitting of units of packaging and involvement of different manufacturers and suppliers in the supply chain.

In the scenario of FIG. 1 a manufacturing plant 10 has production stages 11 manufacturing products packed onto a pallet 12. A tracking sub-system 13 in the manufacturing plant 10 interfaces with the management system 1 (which is remote from it). There is then transport 15 to a distribution warehouse 16 and further transport 17 to a retailer. It will be appreciated that this is a simplified description, as in many cases there are additional transport and warehousing operations, often involving shipping overseas. All operations generate transaction data and transmit it to the management system 1.

Figure 2:
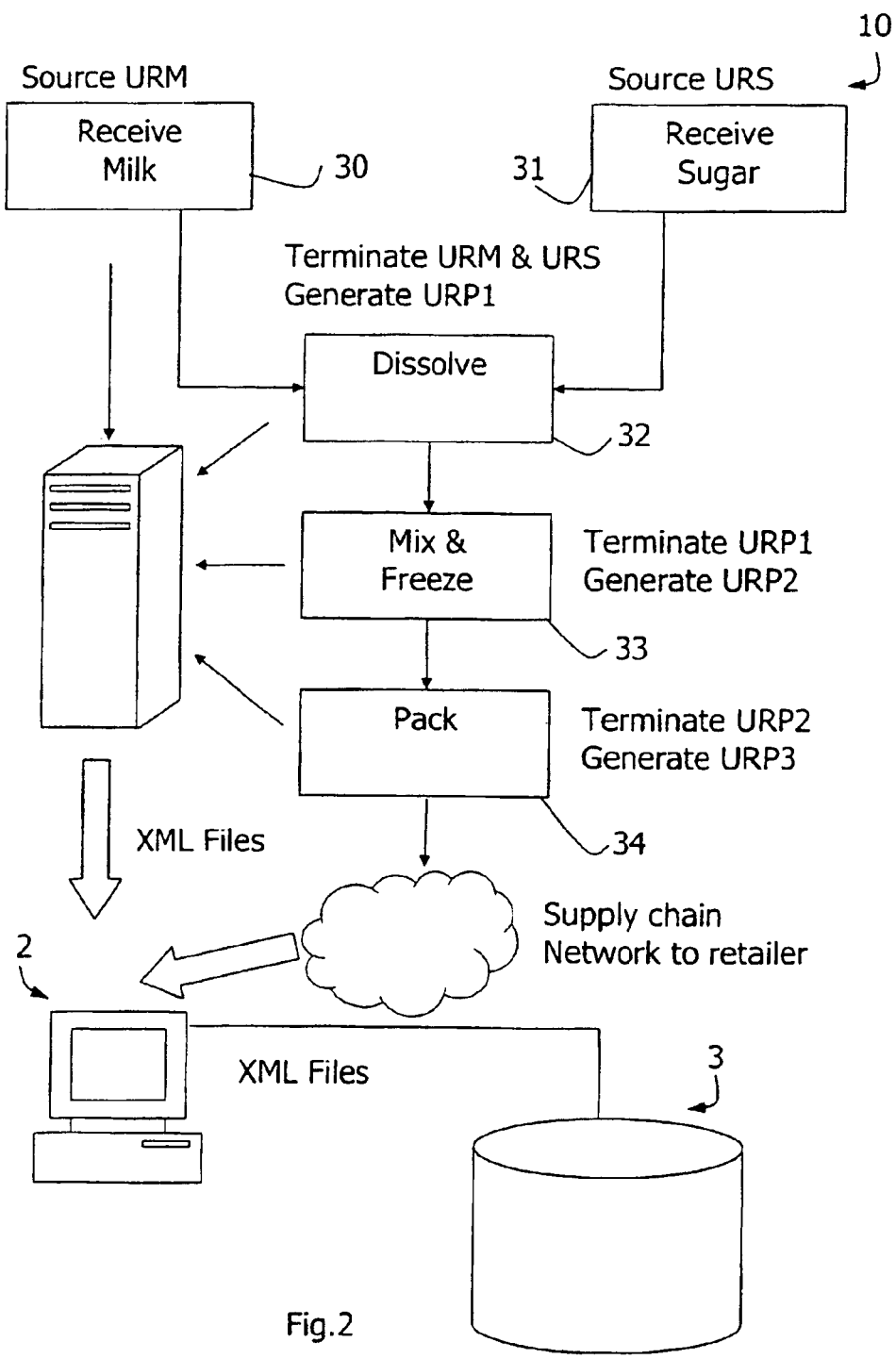
FIG. 2 is a diagram of a manufacturing process and how it interfaces with the system.

Referring to FIG. 2, within the manufacturing plant 10 of this example raw material milk is received in step 30. This milk has a unique reference ("UR") generated by its producer. This is referred to as "URM". The system 1 records the delivery 30 as a transaction record for URM. Likewise, sugar received in a step 31 has its own UR, URS, and the delivery is recorded as a transaction record for URS. In a step 32 the milk and sugar are dissolved. Because the sugar and milk no longer exist as distinct entities their references URM and URS are terminated and their sequences of transaction records are stored in a manner whereby they can be easily accessed at a later stage. Also, in step 32 a new reference, "URP1" is generated for the output of the operation 32, namely a batch of dissolved sugar and milk. In step 33 the liquid is mixed and frozen in operations which are not the subject of this invention to provide a batch of ice cream. Again, because the product input to the step 33 no longer exists, the reference URP1 is terminated and a new reference URP2 is generated for the output of step 33. In step 34 the ice cream is packed to provide a pallet of cases. Reference URP2 is terminated and a new reference URP3 is generated for the pallet. This reference remains with the pallet through the remainder of the supply chain to the retailer. At each step, either manufacture or handling, a transaction record is generated using data received in XML files from the relevant terminal.

The above example scenario is simplified for clarity. In general the supply chain management method has the following aspects:

(a) a fresh unique reference is generated every time a product is created, even if this event is simply splitting a pallet of goods into two pallets, resulting in two new products each with a new reference, (b) each reference incorporates a component derived from the physical location of origin such as a factory identifier, (c) each reference has multiple components, each successive component being unique in the context of the preceding component, (d) every transaction results in generation of a transaction record including the relevant UR, and (e) when a "parent" UR spawns one or more children URs (for example, by splitting a pallet) the fresh URs are linked with the parent UR in the tracking database.

This method ensures that each item exists within its own right no matter where or how it is stored. Each item is unique for as long as the historical data within the database is retained. The system enables the activities carried out on an item and the sub-components of the item to be tracked for the full supply chain. Also, the system ensures that a warehouse is a closed system i.e. that when an item is given this unique reference, the subsequent activities performed on that item will result in a zero balance once that item has left the warehouse or has been transformed into another item within the warehouse. The system provides a visible audit trail on each item. Also, the system allows data from multiple warehouses to be tracked so that the system could provide a hosted service for multiple clients. This is because of the comprehensive and universal nature of the tracking set out above. For example each UR includes as its first component a unique identifier for the originating location and the next component of the UR is unique within this.

Figure 3:
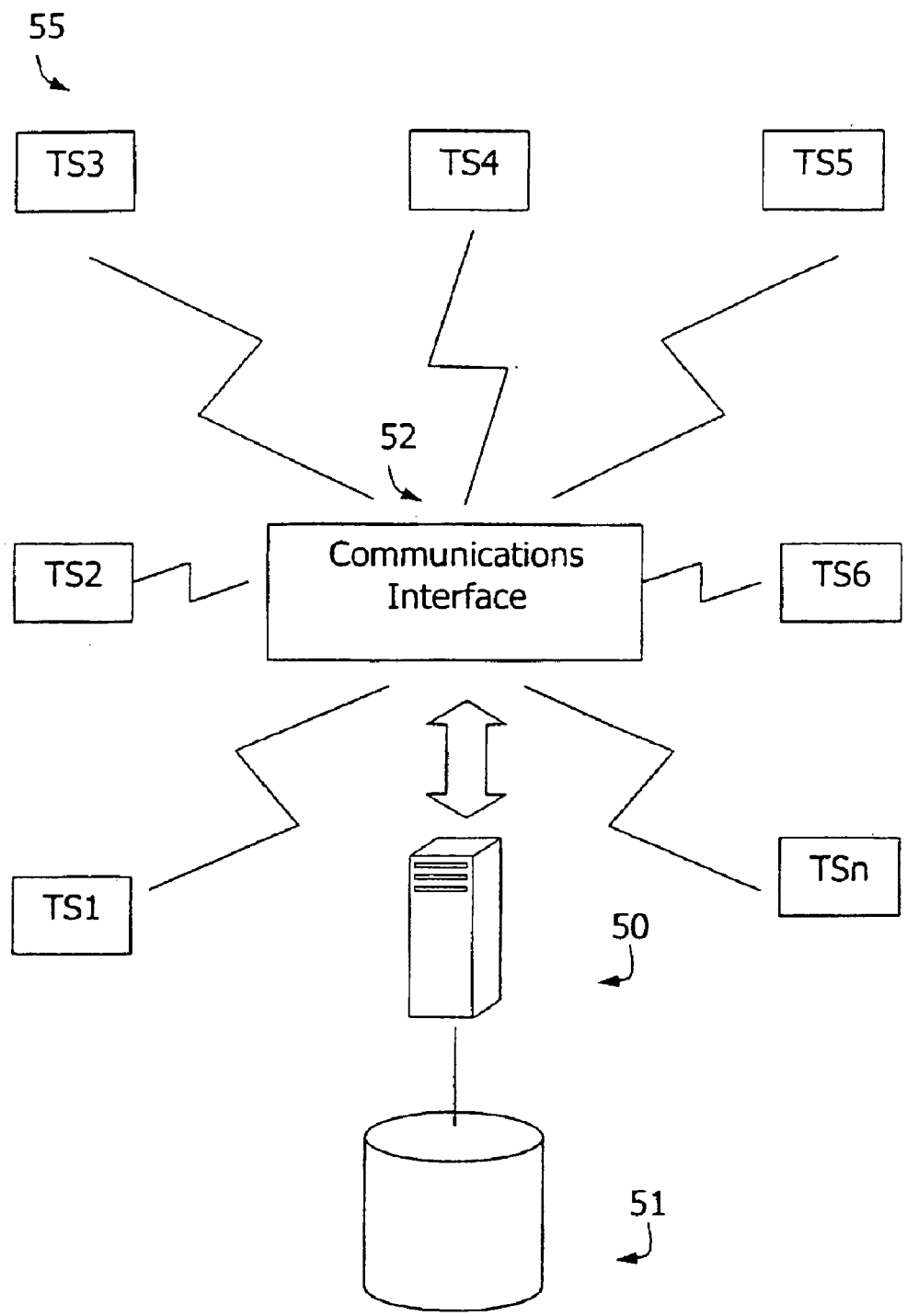
FIG. 3 is a diagram of a universal management system operating for multiple organizations from raw material supply through manufacture and distribution to the retailer.

Referring to FIG. 3 a supply chain management system 50 controls a tracking database 51. It has a communications interface 52 which interfaces with multiple remote transaction sites (TSs) 55 such as factories, warehouses, and retailers. The system 50 hosts a management service oh behalf of many organizations, each having one or more transaction sites 55.

The unique reference consists of seven parts. The parts are alpha-numeric, meaning they can be either numbers or characters. Each part is separated by a "separator character", this could be a ':', a ',' or any other character that will not be used within each part. This means that there is no limit on the size or content of each part, however once the part size and content is initially established, it can not be subsequently altered, otherwise there would be a danger of duplicate unique identifiers. The UR is broken down as follows:

Part 1—The warehouse identifier. This identifies the warehouse that the item originated from. It is unique among multi-warehouse systems. It may also be a unique international warehouse code if such a coding system ever evolves.

Part 2—The transaction type. This is the type of transaction that originated the item (i.e. a goods-in transaction or receipt into the warehouse.

Part 3—The transaction number. Each transaction type has its own unique number system. This could therefore be the goods in number if the transaction type is a goods in transaction.

Part 4—The line number on the transaction. Transactions are broken down into lines. This is to indicate a group of like items together (e.g. 10 pallets of the same product code and batch number).

Part 5—The item number within the line number. Within each line each item receives a unique item number. In the case above each pallet receives a unique item number. It will depend on the "Unit Set" that is being used at the time i.e. if individual drums are being stored, then each drum would receive a unique reference.

Part 6—The item group number. Within each item there may be a number of groups that require discrete tracking, for example there may be three different batch numbers on the one pallet. This is used in pallet merging situations where the tracking of certain "Principal Identifying" data is important.

Part 7—A work reference (optional). This can be used internally for temporary transformation of an item or special requirements depending on the transaction type concerned.

Parts may be omitted and replaced with fill characters such as zeros provided that the uniqueness of the references is not affected and that it identifies the traceable item.

The above reference will remain with the item throughout its life within the warehouse. Once the item has been confirmed into the warehouse an initial transaction record is generated that represents the initiating process. i.e. a goods in transaction is recorded with all the information including the unique reference and quantities. Whenever an action is subsequently performed on that item, it must be performed through a predefined transaction. For example, a stock adjustment would require a stock adjustment transaction and a stock transfer would require a stock transfer transaction. Each of these transactions will record a transaction record with this unique reference on it. The transaction history file can only be added to and never deleted from (apart from specific archiving routines) or changed. A number of different examples of unique references would be:

| Warehouse | Trx Type | Trx No. | Line No. | Item No. | Item Group No. | Sep Chr | Unique Reference |
|---|---|---|---|---|---|---|---|
| "W1" | "R" | "0001234" | "01" | "0003" | "0000" | ":" | W1:R: 0001234:0003:0000 |
| "AX123468" | "154" | "00898789" | "0192" | "19283" | "12390" | "," | AX123468, 154, 00898789, 0192, 19283, 12390 |
| "W1" | "R" | "0001234" | "01" | "0003" | "0000" | ":" | W1:R: 0001234:0003:0000: X91829 (Has the 7'th part used for work purposes) |

In the first example there is a small warehouse code and each of the component parts are designed to suit the application. The resultant unique reference is smaller than the second example and would be attractive for bar code scanning. The important point is that the part sizes, once established are the same and the separator character is consistent. Also the transaction type, number, line number, item number and item group number must be unique within their parent. It is imperative that the component parts are hierarchically unique within each other.

An example of the tracking once the item is identified would be a single pallet with 100 cases on it:

In this example each sequence is an individual transaction record. The system associates dates with these records, and so it can provide an "As At" position of stock at any interval. For example, if one wanted a position of stock at the date associated with the transaction at sequence number 4 the system would provide a figure of 96. Also notice that some transactions have no effect on the overall balance as they are internal or they may only affect non-quantity related data.

On sequence number 7, five cases were transferred to another pallet. Depending on the grouping rules for the principal identifier, the five cases must remain unique on the new pallet and therefore it cannot retain its old reference

| Seq | U.R. | Trx Type | Qty of | Running Qty | New resulting unique reference |
|---|---|---|---|---|---|
| 1 | W1:R 0001234:0003:0000 | "R" - Goods In | +100 | 100 | |
| 2 | W1:R 0001234:0003:0000 | "D" - Delivery | −5 | 95 | |
| 3 | W1:R 0001234:0003:0000 | "A" - Adjustment of 1 | +1 | 96 | |
| 4 | W1:R 0001234:0003:0000 | "T" - Internal transfer entire item from one location to another | 0 | 96 | |
| 5 | W1:R 0001234:0003:0000 | "H" - Item held | 0 | 96 | |
| 6 | W1:R 0001234:0003:0000 | "R" - Item Released | 0 | 96 | |
| 7 | W1:R 0001234:0003:0000 | "T" - (5 cases transfers to another pallet with reference W1:R 0005678:0022:0000 and a different batch no.) | −5 | 91 | W1:R 0005678:0022: 0001. |
| 8 | W1:R 0001234:0003:0000 | "T" - (5 cases transfers to another pallet with reference W1:R 0005678:0023:0000 and the same batch no.) | −5 | 86 | W1:R 0005678:0023: 0000 |
| 9 | W1:R 0001234:0003:0000 | "T" (7 cases transfers to a new pallet with a new reference "W1:T:0004444:01:03: 0000") | −7 | 79 | "W1:T:0004444: 01:03:0000" |
| 10 | W1:R 0001234:0003:0000 | "D" (Delivery of final quantity) | −79 | 0 | | because the 91 cases left on the pallet will use that reference. Also, it cannot use the reference of the "TO" pallet, because it must retain batch number traceability and therefore must remain as a discrete item. It is therefore given the "TO" pallet unique reference and the item group number is incremented by one to ensure that it is unique. A transaction record is created for the removal of the five cases and a transaction created for the new unique reference. On the transaction for the removal of the five cases, the new unique reference is recorded and on the transaction of the new unique reference the original or "FROM" unique reference is recorded. This ensures that full and unbroken traceability is possible.

In example 8 the batch numbers and the grouping rules dictate that batch numbers are the only identifiers that must be traced. Therefore the item is not required to be kept as a discrete item and is merged with the "TO" item, increasing its stock value by 5.

Finally the item is delivered from the store and the balance becomes zero.

Unit Sets

The purpose of the unit set is to allow for flexibility to handle any type of stock and its subsequent variations of configuration. It is a set of units of measure that together define the product in terms of:

1. Storage requirements
2. Breaking down requirements
3. Secondary measurement requirements Each of the units of measure must relate to each other. A unit may be defined as one of four types:

1. —Integral
2. —Volume
3. —Weight
4. —Measurement

For example: A pallet is the Storage Unit and is related to the warehouse configuration. The pallet consists of Cases and therefore cases may be removed from the pallet. When the last case is removed, the pallet is empty and is therefore gone. In addition to this, the cases may have weight recorded against them as a secondary unit. The configuration of this unit set is:

1.—Storage Unit=Pallet
2.—Primary Unit=Case
3.—Secondary Unit=Kilogram

An important rule with the definition of a unit set is that the Storage and Primary units must be integral.

In another example, the system defines a unit set with only drums and liters. The configuration is:

1.—Storage Unit=Drums
2.—Primary Unit=DRUMS
3.—Secondary Unit=Liters

In this example the drum cannot be broken down into integral parts, therefore the storage and primary units are the same. There is no limit on the number of secondary units that may be recorded. In addition to liters the system could also record weight.

The unit set is also designed to allow multiple packing definitions per product. For example, Product X may be packaged in both drums and kegs. In this scenario there would be two unit sets defined for this product, one for the drums and another for the kegs.

The storage and primary units are integral as they must allow for definite states of presence, i.e. they are either there or not there. If non-integral units were used, (i.e. tonnes) then there could be some ambiguity as to whether all the tonnage was there or not there (i.e. residual decimals). The storage unit is used to link the items to the warehouse configuration and controls the location's empty or full status (capacity). The primary unit allows the storage unit to be broken down and therefore when the last item is gone, so too is the storage unit. The secondary units may therefore store anything.

For example, this structure is particularly important for storage such as cold storage. Take a pallet of cases of meat. If one stores and freeze 1 tonne of meat, it will loose weight during the freezing process, to, say, 0.9876 tonnes. As the unit set rules insist on the storage and primary units being integral, when the item is delivered the number of cases or pallets must be designated in integral quantities. Even if the request was for 0.5657 tonnes, it would have to round up or down to the nearest whole primary unit (case). Once the entire Unique Reference has been delivered, the storage and primary units will be zero, but the secondary unit would have a variance of 0.0224 tonnes. A "Weight Difference" transaction is recorded to note the weight loss.

Transactions

The system records every action performed on a stock item, and so forms an audit trail. Typically, the actions performed almost all fall into one of a small set of categories, including manufacture, add stock to the warehouse, remove stock from the warehouse, and transform stock from one form to another. The reason for performing these will differ and it is the purpose of the transactions to:

1. Control the behaviour of an action against a stock item
2. Record the actual details of that action for audit/track and trace purposes.

Nothing can be done to a stock item unless it is performed through a transaction. The system therefore provides a mechanism that is flexible enough to cater for any warehouse action conceivable to be performed, tracked, and audited. As these transactions represent an action within the warehouse, they will also control process flow. Also, the system associates charging and costing details with certain actions performed within the warehouse.

Transactions are defined by a unique type code identifying what action was performed. Any number of transaction types may be designated. For each transaction type a number of standard rules are defined, for example the effect on stock (such as into stock, out of stock, internal transaction, adjustment, no effect on stock etc.).

Every new transaction will receive a unique code for that transaction type. (i.e. the goods in transaction type may be specified as transaction type "GI". This will be used when generating the Unique Reference. To each transaction type, a number of phase codes may be assigned. Each phase represents a process that occurs before the transaction is finally confirmed as being complete. These phases could be sequenced or could simply be used to indicate a particular condition or stage of the transaction. At each phase a number of rules or sub-actions could be specified to be performed.

When a transaction is confirmed as being complete, a record of that transaction is made. Each record stored must be stored with at least the unique reference, date, time and quantities of the item that the transaction was performed against although it should also record responsibility information and other details as deemed necessary for auditing and tracking purposes. These transaction records cannot be deleted or changed.

A single transaction could affect many unique references. In order to structure these, the transaction will use unique lines within the transaction for groups of similar items and unique items within a line to represent each unique reference. Some examples of a transaction that put stock into the warehouse:

EXAMPLE

The transaction type is a goods-in with three products and eight pallets of stock. The transaction is 'R', the designated transaction number is 1234 and the warehouse is 'W1'.

| Product | Line Number | Item Number | No Pallets/ Cases | U.R. |
|---|---|---|---|---|
| Bananas | 1 | 1 | 3/300 | "W1:R:0001234:01:0001:0000" |
|  |  | 2 |  | "W1:R:0001234:01:0002:0000" |
|  |  | 3 |  | "W1:R:0001234:01:0003:0000" |
| Apples | 2 | 1 | 2/200 | "W1:R:0001234:02:0001:0000" |
|  |  | 2 |  | "W1:R:0001234:02:0002:0000" |
| Oranges | 3 | 1 | 2/200 | "W1:R:0001234:03:0001:0000" |
|  |  | 2 |  | "W1:R:0001234:03:0002:0000" |

For this transaction type the system has designated a number of processes or phases that match the operation for this warehouse:

Phase 1—Record Goods-In details as supplied by driver ("RECORD").

Phase 2—Unload the vehicle and check the details are correct ("CHECKING").

Phase 3—Put the stock into the warehouse ("PUTAWAY")

Phase 4—Add charging details ("CHARGE").

Phase 5—waiting arrival.

This is a totally arbitrary assignment of phase code. In this example phases 1,2,3,4 may follow each other automatically. Phase five may be left aside for pre-entering the transaction in anticipation of its arrival.

Once the last phase in the automatic sequence is executed, the transaction becomes confirmed and must not be altered from that point forward. Note also the way the Unique Reference is generated, as this is the first time these goods have arrived.

EXAMPLE

This time the stock is adjusted into the system because the goods-in transaction had been confirmed, but one pallet had been left out. The transaction type to be used for this would be an adjustment transaction and the transaction type code "A" is assigned. The transactions number is 78.

This time, the transaction is recorded, the additional information recorded against it is the original goods-in transaction number that the item should have been added to. This will ensure that when the system tracks goods-in number 1234, it will include this adjustment transaction also.

| Product | Line Number | Item Number | No Pallets | U.R. |
|---|---|---|---|---|
| Bananas | 1 | 1 | 1 | "W1:A:0000078:01:0001:0000" |

Now consider some transactions that do not add stock into the warehouse, but either change the stock item characteristics or remove the stock from the warehouse completely.

EXAMPLE

An order is placed to deliver three cases of bananas to a customer. The transaction type used will be a delivery transaction with a type of 'D'. The transaction number will be 99 and the warehouse is "W1".

| Product | Line Number | Item Number | No Pallets/ Cases | U.R. |
|---|---|---|---|---|
| Bananas | 1 | 1 | 0/3 | "W1:R:0001234:01:0001:0000" |

Note that the unique reference is the original receipt unique reference that the three cases have been picked from. The transaction audit trail for U.R. "W1:R:0001234:01:0001:0000" will be as follows:

| Trx Type | Trx No | Line No. | Item No. | Qty of | Running Qty |
|---|---|---|---|---|---|
| "R" | 1234 | 1 | 1 | 100 | 100 |
| "D" | 99 | 1 | 1 | 3 | 97 |

EXAMPLE

An adjustment is now made that will actually change the batch number on one of the items. In the above example, suppose batch number "ABC777" was recorded with the original goods-in transaction. The system again used an adjustment transaction to change the batch number from ABC777 to XYZ777. The batch number field is a principal identifier and therefore requires audit control. In order to keep the auditing on the batch number correct, the system records a deleting transaction against batch number ABC777 and an addition transaction to Batch Number "XYZ777". The Transaction type is "A" and the number is 104, warehouse "W1".

| Product | Line No. | Item No. | No Pallets/ Cases | U.R. | Batch No |
|---|---|---|---|---|---|
| Bananas | 1 | 1 | −97 | "W1:R:0001234:01:0001: 0000" | ABC777 |
|  | 1 | 2 | +97 | "W1:R:0001234:01:0001: 0000" | XYZ777 |

The transaction audit trail looks like this:

| Trx Type | Trx No | Line No. | Item No. | Qty of | Running Qty | Batch No |
|---|---|---|---|---|---|---|
| "R" | 1234 | 1 | 1 | 100 | 100 | ABC777 |
| "D" | 99 | 1 | 1 | 3 | 97 | ABC777 |
| "A" | 104 | 1 | 1 | −97 | 0 | ABC777 |
| "A" | 104 | 1 | 2 | +97 | 97 | XYZ777 |

The amount of detail recorded against each transaction is unlimited. In addition to auditing and tracking details, charge and cost codes can also be linked to each transaction. These charges and costs could the point to pre-defined schedules that would allow the generation of billing and costing details on a transaction-by-transaction basis.

Warehouse Configuration

Each location such as a warehouse is a closed system: what goes in must be auditable and traceable no matter where it is within the warehouse or what happens to it until it leaves the warehouse. The unique reference and transactions account for some of this requirement, however there is the difficulty of where to record the storage location. The system manages warehouse configuration including the concept of regions within the warehouse. This allows for the recording of stock as soon as it has been made known to the warehouse. The warehouse is broken down into regions. Each region is classified as having a "location capacity" regime or a "limitless capacity". When a region is identified as having a capacity, then it may be further broken down into unique locations. Each location is given a capacity measured against the "base unit" chosen for the warehouse. The base unit could be in any suitable measure i.e. meters, feet, pallets etc. When the product unit-set (see above) is defined with a storage unit, then that storage unit must also have an equality to the base unit. For example, if a location is 2.4 meters wide, and a U.K. Pallet is 1.2 meters, then the effective X capacity of the location is 2 U.K. pallets. Alternatively, if a Euro Pallet is defined as 0.8 meters, then the location X capacity is 3 Euro pallets or 1 U.K. pallet and 1 Euro Pallet. Three dimensional capacities may be defined for a location using this technique (i.e. X,Y,Z). If the region does not have a finite capacity, then it may be subdivided into unique areas. Infinite stock may be moved into and out of these areas. When an item is created with a unique reference, using this method, it may be given a region and location/area reference component thereby immediately ensuring its traceability.

As described above with reference to FIG. 3 the system 50 processes data for multiple warehouses using the same techniques for recording stocks and tracking transaction. If each of the warehouses involved in the "Tracking Consortium" is uniquely registered with a warehouse code, then this warehouse code will form the first part of the unique reference. Each warehouse will then subscribe to a "Tracking Control Centre" or "Data Exchange". Each time a transaction occurs within their system that affects the quantity or traceability requirements of that item it must be reported to the "data exchange". The transaction will either be registered centrally of each member within the consortium would have access to each others transaction data for track and trace purposes. Therefore the unique reference once assigned, would remain unique throughout it's movement within the consortium.

EXAMPLE

A manufacturer produces goods. As the goods are palletised, the pallet is issued with a unique reference which is then made available to the consortium. The product then moves to a holding warehouse where it is recorded as having arrived and the data relating to that unique reference is transferred to the holding warehouse. The holding warehouse may then perform a number of tasks/transactions to that unique reference; each task is recorded and made available to the consortium. It is then shipped (totally or partially) to a distribution warehouse and again the unique reference (or whatever form the unique reference is now in) travels with the item. The details are then passed to the distribution warehouse. The item or parts of the item are then finally shipped to a retail outlet, and again the details will travel to the retail outlet based on the unique reference. By using the consortium's data exchange, the tracking from birth to death of an item and hence it's associated references (i.e. batch number) can be traced. This is very effective for managing product recalls.

The invention is not limited to the embodiments described but may be varied in construction and detail.

What is claimed is:

1. A supply chain management method implemented by a processor, a storage device, a communications interface, and user terminals or computers, the method comprising the steps of:

(a) the processor generating a fresh unique reference for an item at the start of its life in a supply chain, said unique reference incorporating a component derived from the physical location of origin of the item, and said reference has multiple components, each successive component being unique in the context of the preceding component;

(b) for every transaction involving the item, transmitting transaction data via the communications interface, generating a transaction record including the unique reference of the item and storing the transaction record in the storage device;

(c) if the item is modified, performing steps (a) and (b) above for a spawned item derived from the modified item, the modified item being a parent item and the spawned item being a child item, linking in the storage device the unique reference of the child item with the unique reference of the parent item; and (d) when an item terminates in the supply chain, preventing generation further transaction records for the unique reference of the item.

2. The method as claimed in claim 1, wherein the unique reference includes a unique identifier for each of a plurality of locations for a plurality of manufacturing or supply organizations.

3. The method as claimed in claim 1, wherein splitting of an item comprising a collection of sub-items is treated as modification of the original item.

4. The method as claimed in claim 3, wherein such modification spawns a plurality of fresh unique references, each for a sub-division of the original item.

5. The method as claimed in claim 1, wherein the method validates generation of a fresh unique reference by comparing measure units of the modified item with those of the source item, and generates an error message if they are different.

6. The method as claimed in claim 1, wherein a transaction type identifier is included with each transaction record.

7. The method as claimed in claim 1, wherein a transaction type identifier for the transaction which generates the item is included as a component in the unique reference.

8. The method as claimed in claim 1, wherein each transaction record comprises a unique transaction identifier.

9. The method as claimed in claim 1, wherein a transaction record includes a plurality of unique references, each for an item involved in the transaction, such as combining two products in a manufacturing operation.

10. The method as claimed in claim 1, wherein some locations have an associated unit of measure and an error message is generated if different measure data is received for a location.

11. A supply chain management system comprising means for performing a method as claimed in claim 1.

12. A computer program product comprising software code for performing a method of claim 1, when executing on a digital computer.

* * * * *